United States Patent [19]

Katscher

[11] 4,240,875
[45] Dec. 23, 1980

[54] NUCLEAR ENERGY PLANT WITH COLLECTING CONTAINER FOR MELTING CORE MASSES

[75] Inventor: Werner Katscher, Jülich-Stetternich, Fed. Rep. of Germany

[73] Assignee: Kernforschungsanlage Jülich Gesellschaft mit beschränkter Haftung, Jülich, Fed. Rep. of Germany

[21] Appl. No.: 868,289

[22] Filed: Jan. 10, 1978

Related U.S. Application Data

[63] Continuation-in-part of Ser. No. 693,333, Jun. 7, 1976, abandoned.

[30] Foreign Application Priority Data

Jun. 7, 1975 [DE]  Fed. Rep. of Germany ....... 2525554

[51] Int. Cl.² ...................... G21C 15/12; G21C 15/18
[52] U.S. Cl. ........................................ 176/38; 176/37; 176/62
[58] Field of Search ................ 176/37, 38, 40, 50

[56] References Cited

U.S. PATENT DOCUMENTS

| 3,115,450 | 12/1963 | Schanz | 176/38 |
|---|---|---|---|
| 3,607,630 | 9/1971 | West | 176/38 |
| 3,888,730 | 6/1975 | Jackson | 176/40 |
| 3,935,063 | 1/1976 | Dunckel | 176/38 |
| 4,003,785 | 1/1977 | Rau | 176/38 |

FOREIGN PATENT DOCUMENTS

| 2320091 | 11/1974 | Fed. Rep. of Germany | 176/38 |
|---|---|---|---|
| 2363844 | 6/1975 | Fed. Rep. of Germany | 176/38 |
| 2363845 | 6/1975 | Fed. Rep. of Germany | 176/38 |
| 2622050 | 8/1977 | Fed. Rep. of Germany | 176/38 |

OTHER PUBLICATIONS

Jansen, G., Stepnewski, D. D., Finch, L. M., "Fast Reactor Fuel Interactions After A Hypothetical Core Meltdown.".
*Transactions of the American Nuclear Society,* vol. 13, No. 1, Jun. 26, 1970.
Chirkin, V. S., *Systems of Heat Removal from Nuclear Reactors,* Journal of Nuclear Engineering, vol. 5, pp. 124-134.

*Primary Examiner*—Samuel W. Engle
*Assistant Examiner*—Edward F. Miles
*Attorney, Agent, or Firm*—Becker & Becker, Inc.

[57] ABSTRACT

A nuclear energy plant with a reactor protecting container in which below the reactor core there is provided a cooled collecting container for molten core masses while cooling pipes are inserted in the wall of the collecting container. The cooling pipes are designed as heat pipes. One end of the pipes is arranged within the region of the inner wall of the collecting container. The other end of the pipes extends into the inner chamber of the cooling tank which is arranged outside the reactor protecting container or containment and is open toward the atmosphere.

5 Claims, 1 Drawing Figure

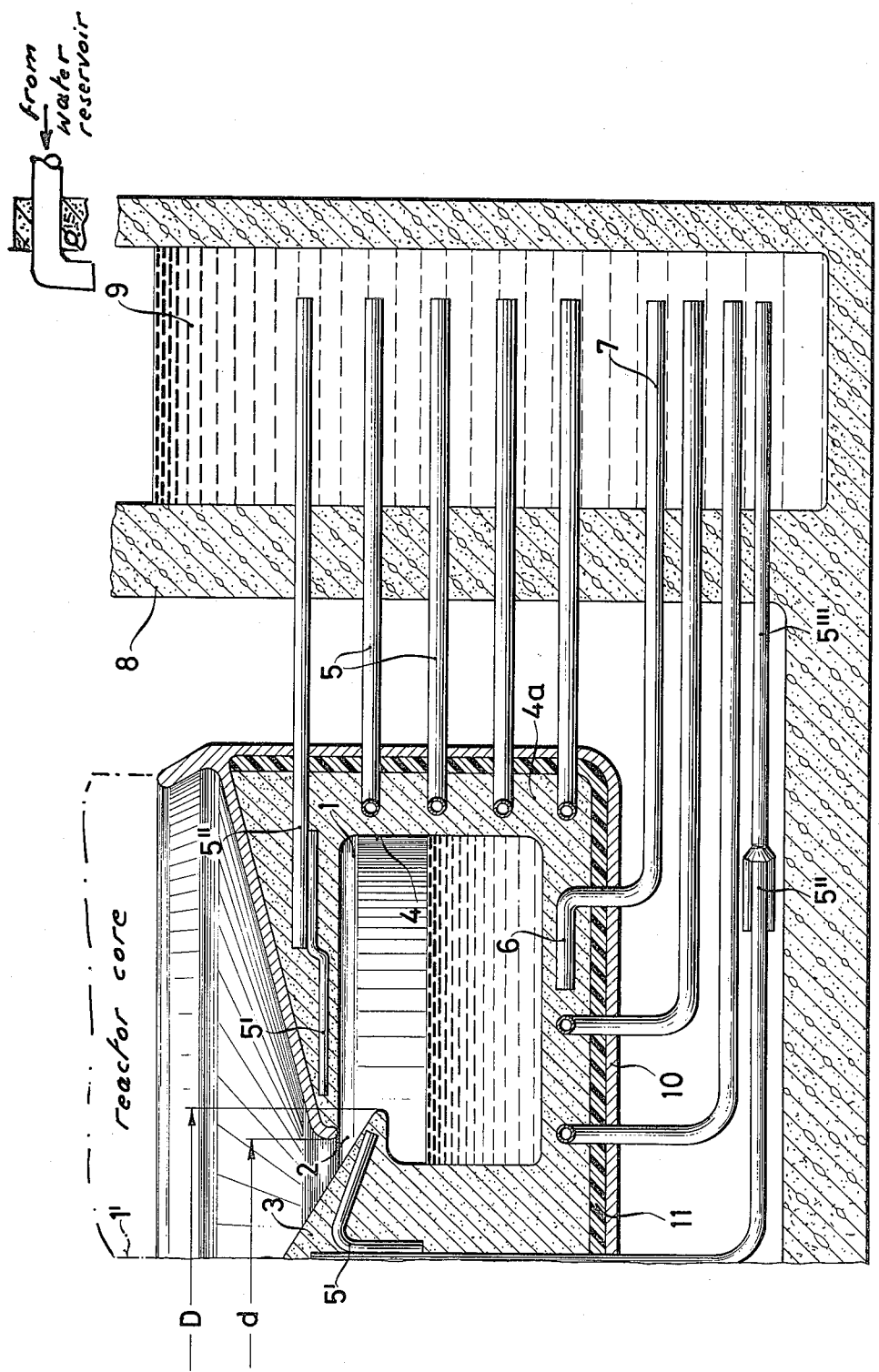

NUCLEAR ENERGY PLANT WITH COLLECTING CONTAINER FOR MELTING CORE MASSES

This is a continuation-in-part of co-pending application Ser. No. 693,333—Katscher filed June 7, 1976, now abandoned.

The present invention relates to a nuclear energy plant with a reactor protecting container in which below the reactor core there is arranged a cooled collecting container for molten core masses. Coaling pipes are inserted into the wall of the collecting container.

For judging the safety of a nuclear power plant, presently the worst imaginable accident (GAU) is decisive and is assumed to involve as a rule the smooth double sided break of a primary cooling fluid conductor and consequently the loss in the cooling medium. For such a situation, the turning off and post heat withdrawal system of the nuclear plant is so designed that even with a partial response there is also assured a safe turning-off and post heat withdrawal thus to prevent that fission products are released into the environment. Even though the probability for the functioning of the turn-off and post heat withdrawal systems is set very high, no guarantee can be given with absolute safety that a failure in any turning-off and post heat withdrawal systems will never occur. It will be appreciated that in such an instance the loss of the cooling medium will bring about a melting of the reactor core of the nuclear energy plant; in such a situation with a molten nuclear power plant, an operational output of approximately 4,000 MWth will occur at the time of said failure with a heat production of approximately from 40 to 120 MW. Thus, there exists the danger that the molten core masses destroy the bottom of the reactor protecting container and enter the earth. The intensive heat radiation would in addition thereto damage the reactor protecting container and would release into the environment fission products present in the reactor core.

In order to prevent such accident, it is known below the reactor core to provide collecting containers into which the molten core masses could flow. In the collecting containers, the core masses are cooled to such an extent that a destruction of the reactor core protecting container will be avoided. The cooling system of the collecting container has to meet high requirements because in the assumed disorder incident, the reactor core will melt together in a very short time.

There has also become known a bowl-shaped collecting container with a funnel-shaped cover which is urged toward the interior of the bowls (L. Barleon et al "Temperature and Heat Flux Distribution in the Molten Core Mass of a GCFR After a Hypothetical Melt-Down", KFK 1755, November, 1972) An opening in the center of the covers is covered by means of a mushroom-shaped column in such a way that heat radiation into the reactor chamber from core melt passed into the collecting containers will be prevented. For cooling the core catching walls, cooling coils are built into said walls. The above mentioned cited publication does not disclose anything about the type of cooling medium and its transport nor is anything mentioned about the withdrawal of heat from the cooling medium. The German patent disclosure No. 2,320,091-Hunt dated Nov. 7, 1974, discloses a collecting container having conveyed thereto water as cooling medium in a natural drop from a storage container which is located above the collecting container. When receiving quantities of heat from the molten core masses, the water evaporates and is released freely into the atmosphere. Such cooling system, however, has the drawback that in view of the required withdrawal of the steam, the cooling pipes themselves have to be open toward the atmosphere. In case of a break in the cooling pipe, this brings about an immediate release of fission products contained in the molten core masses into the environment of the core reactor plant. While it is also known from German patent disclosure No. 2,055,089 to equip the cooling system with steam, it will be appreciated that the given mutual inter-dependence of the cooling elements passing through the collecting container affects the necessary safety for a proper operation of the cooling system when the above mentioned disorder occurs.

It is, therefore, an object of the present invention to provide a collecting container for molten core masses with which the cooling system will work substantially free from disorders and independently of the functional ability of driving systems will make available the necessary cooling output to its full extent to prevent a freeing of fission products into the environment.

These objects and other objects and advantages of the invention will appear more clearly from the following specification in connection with the accompanying drawing diagrammatically illustrating a cross section through a collecting container with a cooling tank partially cut arranged outside the reactor protecting container.

The nuclear energy plant with a reactor protecting container according to the invention in which below the reactor core there is provided a cooled collecting container for molten core masses while cooling pipes are inserted into the wall of the collecting container. This arrangement is characterized primarily in that the cooling pipes are designed as heat pipes with one end of the conveying pipes being arranged within the region of the inner wall side of the collecting container. The other end thereof is guided in the interior chamber of a cooling tank which is located outside the reactor protecting container or containment and is open toward the atmosphere. Heat pipes are known per se. They are formed by pipes which are closed at both ends and are filled with a liquid heat conveying substance. At one end of such heat pipes, the heat conveying substance evaporates while absorbing heat, whereas the other end of such heat pipe gives off heat by condensation of the heat conveying substance. For the return transport of the liquid phase of the heat conveying substance from the condensation zone to the evaporation zone of the heat pipe, capillary forces are used which occur in a capillary system that connects the condensation zone with the evaporation zone (see Chemie-Ing.-Techn., 1969, Issue 1, Pages 30 to 40). Due to the insertion of heat pipes each forming a cooling system closed in itself, a high degree of safety is created for the operational capability of the cooling system in the collecting container. In view of the closed design of the heat pipes, also in case of a break of heat pipes, no fission products will pass into the environment. The cooling tank is preferably filled with water. The cooling tank is open toward the atmosphere so that the water steam generated at those ends of the heat pipes which lead into the cooling tanks can freely escape.

An advantageous further development of the invention consists in that between the inner wall side of the collecting container and the cooling tank there are arranged in series a plurality of heat pipes. This arrangement permits a location of the heat pipes in conformity with optimum aspects, especially with regard to limiting the pressure loss in the interior of a heat pipe. The cooling of the wall of the collecting tank is advantageously further aided by increasing the number of the heat pipes per surface unit area within the region of the inner wall side of the collecting tank.

In order to assure a safe heat withdrawal over a longer cooling period in the cooling tank, a further development of the invention is to connect the cooling tank to an extinguishing pond. Preferably, the cooling tank is connectable to natural water reservoirs. A uniform utilization of the available heat pipes is realized by the fact that on the inner wall side of the collecting tank there is provided a lining of a good heat conducting temperature resistance material which will only slightly chemically react with the molten mass. Advantageously, such lining consists of silicon carbide. In order to prevent the collected core mass from becoming critical, the lining is expediently doted with neutron poison, especially B, Cd, Hf, Er.

IN THE DRAWING

The drawing shows a nuclear energy plant arrangement having features including a collecting container for core masses in accordance with the present invention.

Referring now to the drawing in detail, a collector container 1 is arranged below a reactor core of a nuclear energy plant. The collecting container 1 is so dimensioned that its annular inner chamber, which extends symmetrically around the axis 1' of the collecting container 1, can receive the melting core mass as well as the structural material of the upper structures of the reactor plant; such structural material drops during the melting operation. For purposes of catching the melt, a column 3 of mush-room shape is arranged centrally in an opening 2 provided at the center of the cover of the collecting container 1. The diameter D of the mush-room head of column 3 is greater than the diameter d of opening 2 in order to avoid a heat radiation toward the outside of the melt which passes into the inner chamber of the collecting container 1. The melt cools off on an inner wall side 4 of the collecting container 1. For purposes of conducting away the heat, heat pipes 5 are inserted into the wall 4. An end 6 of a heat pipe 5 is arranged within the region of the wall side 4 of the collecting container, whereas the other end 7 is passed into the inner chamber of a cooling tank 9. The cooling tank 9 is arranged outside a reactor protecting container or containment 8 and is open toward the atmosphere.

In conformity with the embodiment shown in the drawing, the cooling tank 9 is filled with water. Water is preferred in the cooling tank because on the one hand its specific heat of evaporation is very high and on the other hand an evaporation of the water does not present any risk. Furthermore, as a rule, water reservoirs are located in the vicinity of nuclear energy plants and are available for the withdrawal of heat. In the embodiment shown, with a nuclear energy plant having an output of 4,000 MWth and assuming a remaining output of 3% to be withdrawn through the heat pipes 5 in the cooling tank 9, approximately 190 tons of water are required per hour. The required quantity of water is obtainable by connecting the cooling tank 9 with natural water. However, it is also possible to connect a corresponding laid out cooling pond to the cooling tank which pond may under certain circumstances also be adapted to be filled by tank trucks. In order to convey the quantity of heat generated by the molten core masses, as uniformly as possible, in the inner wall side 4 of the collecting container 1 to the heat pipes 5, the inner wall 4 is provided with a lining 4a of a good heat-conducting heat-resistant material which chemically reacts only marginally with the molten mass or melt. Such material, for the specific embodiment shown in the drawing may consist of graphite. Advantageously, silicon carbide may be used as material for the lining 4a, and the lining may be doped with neutron poison such as boron, cadmium, hafnium, and erbium, in order to prevent the molten core mass from becoming critical. Between the graphite lining and a supporting outer wall 10 of the collecting container there is provided a thermal insulating layer 11.

A further reduction of temperature peaks in the wall will be realized by locally increasing the number of heat pipes 5 on the inner wall side 4 of the collecting container 1 on which the highest temperatures occur. At these places, the heat pipes in the embodiment also have smaller pipe cross sections. Thus, above all, it is possible advantageously to cool the portions of a collecting container having a thin wall thickness. Furthermore, in the illustrated embodiment of the invention, in addition to heat pipes extending from the inner wall side 4 of the collecting container to the cooling tank 9, also heat pipes 5', 5'', and 4''' are used which are arranged in series one behind the other.

As heat conveying substance in the heat pipes there may be used in particular substances with high specific heat of evaporation. The substances should furthermore be liquid at room temperature. For this purpose, water is particularly suitable as a heat conveying substance.

U.S. Pat. No. 3,607,630—West, et al issued Sept. 21, 1971, foreign German Pat. No. 2,320,091—Hunt, et al and German Pat. No. 2,363,844—Albrecht, et al disclose utilization of water for cooling of containers for catching molten core masses. The known catching containers provide a cooling pipe system to which cooling water is suplied from a water storage means arranged above the catching container. The cooling water after vaporizing is to be discharged into one or more separate riser conduits so that water can flow continuously pursuant to the pipe system from the water storage means. Disadvantageous with such a cooling system is, however, that the necessary positive guidance of the cooling medium requires control devices, that preclude steam or vapor which develops to block in an undesirable manner the addition of further water from the water storage means. Additionally, there is disadvantageous that upon a break, rupture or interruption of a cooling medium conduit, fission products also can escape by way of the riser conduits, which leads to contamination of the reactor chamber surrounded by a containment or which during blowing-off of the vapor into the atmosphere can result in direct endangering of the environment.

These disadvantages cannot be eliminated by transferring an embodiment of U.S. Pat. No. 3,935,063—Dunkel issued Jan. 27, 1976, for a cooling system for reactor core container means by way of heat pipes onto the known cooling devices for catching containers as disclosed by West, Hunt et al and Albrecht et al. There is apparent much more from FIG. 3 of Dunkel, that such a combination, particularly does not lead to the features of the present invention. The expert obtains from Dunkel that also during utilization of heat pipes there cannot be eliminated the known water cooling, and the expert realizes that it is necessary to control the cooling medium supply (compare U.S. Pat. No. 3,935,063 of Dunkel, column 3, lines 21-23); and there is also necessary to plot a curve of prevailing temperatures and to actuate valves to provide an active emergency cooling system (compare U.S. Pat. No. 3,935,063 of Dunkel, column 8, lines 14-28). Such active emergency cooling systems, however, provide a great disadvantage. With extreme disturbance cases (and the melting of a core represents such a disturbance case), there must be proceeded on the basis that control systems of the active type, accordingly regulation systems of which the operation is dependent upon supply of foreign energy, are no longer capable of being installed or utilized.

According to the present invention, there is provided a pure passive cooling system. For the construction of this system, it is now merely necessary to exchange the known pipes for heat pipes, or to make provision for the heat pipes known from U.S. Pat. No. 3,935,063 Dunkel to be permitted to terminate in a water storage means known from U.S. Pat. No. 3,607,630 West, German patent disclosure Nos. 2,320,091 of Hunt et al, and 2,363,844 of Albrecht et al. Moreover, aside therefrom that the latter disclosure does not appear to be desirable at all because of the uninterrupted cooling of the reactor core container arising therewith, the present invention in contrast provides that one end of the heat pipe means is arranged within the wall of the catching container in the region of the inner wall side and the other end of the heat pipe means is guided into a cooling basin or cooling tank, which is arranged externally of the containment. Such a construction of the emergency cooling system is not made obvious for the expert in any manner through combination of the teaching of the prior art. According to the present invention, there is first set forth an emergency cooling system which utilizes both the advantages of a cooling basin accessible externally of the reactor containment with which also care is taken that during a break or interruption of cooling medium conduits, which cannot be precluded, that no fission products come into the environment. No showing or suggestion can be found to be provided for these features of the present invention when considering the prior art.

The teaching of the German disclosure No. 2363845—Leopold et al, however, also does not go beyond the prior art already acknowledged to exist since there is recognizable in this disclosure only that cooling water pipes are arranged in the walls of the catching container. This, however, does not make obvious for the expert, especially in connection with the remaining references, any embodiment of the catching container of the present inventive manner. There cannot be ascertained from German disclosure No. 2,363,845 of Leopold, et al in any way a showing or suggestion that there would be avoided the aforementioned disadvantages with these cooling pipes with the cooling of the catching container means.

On the one hand there is known from U.S. Pat. No. 3,607,630 of West et al and also from German patent disclosure No. 2,320,091 of Hunt et al to cool the receptacle or receiving container for melting core masses of a nuclear energy plant by means of a cooling device whereby the cooling tubes are guided in the wall means of the outer container and that on the other hand from Dunkel is is known to install heat pipes for cooling of parts of a reactor. An attempt may be made to replace the water guiding cooling pipes described by U.S. Pat. No. 3,607,630 of West et al or the German patent disclosure No. 2320091 of Hunt et al by way of the heat pipes known from U.S. Pat. No. 3,935,063 of Dunkel. Attention is directed especially thereto that the heat pipes of Dunkel would be located in heat conduction connection with a water containing basin.

These features, however, do not anticipate the crux or essence of the present invention. The concern of the present invention is not solely to install heat pipes in place of the known water guiding cooling pipes for cooling of receptacles or receiving containers of melts of the core masses. By way of such an exchange of technically equivalent means, the object of the present invention could not be resolved at all. As apparent from specification for the present case, the object of the present invention is to provide a teaching for the expert or average man skilled in the art in which manner a cooling of the receptacle or receiving container is possible which is effective independently of the frictional capability of foreign aggregates and simultaneously the release of fission products into the environment is precluded upon encountering a disturbance situation.

This object of the present invention is resolved thereby by having one of the ends of the heat pipes embedded in the wall means of the receptacle or receiving container for melting core masses and that the other end is guided into a cooling basin open to atmosphere as arranged externally of the containment. A feature of the present invention accordingly is not solely the use of heat pipes for cooling of the receptacle or receiving container in connection with a water container. The present invention moreover provides the teaching to install heat pipes in a manner so that the heat arising with the core melt is conducted directly into a wall basin arranged in the environment of the nuclear core reactor system. The cooling system according to the present invention is effective in a purely passive manner; simultaneously no danger exists even then when a portion of the heat pipes inside the containment were damaged upon encountering the disturbance situation; such danger would include that fission products could be released into the environment by way of the destroyed heat pipes from the inner chamber of the reactor plant since the end of the heat pipes guided to the outside into the cooling basin is closed. Such an embodiment of the system for the receptacle or receiving container could not be found in any way to be shown or suggested by the prior art. Both with U.S. Pat. No. 3,607,063 of West et al and also with the German patent disclosure No. 2,320,091 of Hunt et al all elements belonging to the cooling system are arranged inside the outer safety container of the containment (compare U.S. Pat. No. 3,607,630 of West et al, for instance, column 3, line 67 and column 4, line 2 as well as the German patent disclosure No. 2,320,091 of Hunt et al, page 3, paragraph 5 through page 4, paragraph 2, especially in lines 3 etc.). All elements of the cooling system are also arranged inside the containment or container in accordance with U.S. Pat. No. 3,935,063 of Dunkel. Additionally, there cannot be disregarded that the described cooling systems form active cooling systems which means that these cooling systems of the references are capable of functioning only when the control valves for the supply of cooling medium are still adjustable after occurrence of the disturbance situation. Consequently, the heat exchange mentioned in a disadvantageous manner is not possible independent of the ready capability of installing additional control means. This, however, represents a safety risk unaccepatable in the case of a disturbance situation under consideration with the present disclosure. A suggestion as to how this problem could be resolved cannot be ascertained for the expert from the prior art. The present disclosure must be credited favorably with resolving the problem at hand to provide aid in meeting the object of the present invention.

The present invention, accordingly, concerns a passive cooling system for catching container for a molten nuclear or core mass, in other words, a cooling system which operates independently of functional capability of foreign aggregates. This characteristic of the cooling system is readily recognizable for the expert in the designation "passive emergency cooling system".

It is, of course, to be understood that the present invention is, by no means, limited to the specific showing in the drawing, but also comprises any modifications within the scope of the appended claims.

What I claim is:

1. A passive emergency cooling system independently operable for a nuclear energy plant emergency which includes in combination: a reactor core, a collecting container having a heat-conducting and heat-resisting inner wall portion, an outer supporting wall and an intermediate thermal insulating layer between said inner wall portion and said outer wall, said container being arranged below said reactor core for collecting molten core masses, an outer reactor-protecting container means arranged in spaced relationship to and surrounding said collecting container, an annular cooling tank open toward the atmosphere and arranged externally accessible outside of and surrounding said said reactor-protecting container means, cooling pipes designed as heat pipes and inserted in said inner wall portion of said collecting container so that during a break of interruption of the cooling pipes care is taken that no fission products come into the environment, one end of said heat pipes being evaporator ends extending into and terminating within said inner wall portion of said collecting container, said pipes being passed through said outer reactor-protecting container means, the other end of said heat pipes being condensor ends and extending into and terminating in said cooling tank located externally accessible always to maintain cooling capability open toward the atmosphere regardless of any internal failure.

2. A passive emergency cooling system in combination according to claim 1, which includes a plurality of heat pipes, certain of which are constituted by two pipes arranged successively in series to extend between the inner wall portion of said collecting container and said cooling tank.

3. A passive emergency cooling system in combination according to claim 2, which includes an increased number of heat pipes per surface unit within the region of the inner wall portion of said collecting container.

4. A passive emergency cooling system in combination according to claim 3, in which said cooling tank is provided with means for connecting to an extinguishing pond.

5. A passive emergency cooling system in combination according to claim 3, in which said cooling tank is provided with means for connecting to natural waters.

* * * * *